United States Patent [19]

Makino et al.

[11] Patent Number: 4,717,503

[45] Date of Patent: Jan. 5, 1988

[54] DEMOLITION AGENT FOR BRITTLE MATERIALS

[75] Inventors: Yoshio Makino, Tokyo; Toshiaki Kakinuma, Yokoze; Tomio Iwata, Chichibu; Masumi Itoh, Takatsuki; Takayoshi Hirose, Osaka, all of Japan

[73] Assignees: Mitsubishi Mining & Co., Ltd., Tokyo; Fujisawa Pharmaceutical Co., Ltd., Osaka, both of Japan

[21] Appl. No.: 522,671

[22] Filed: Aug. 12, 1983

[30] Foreign Application Priority Data

Aug. 18, 1982 [JP] Japan ................. 57-142794
Feb. 28, 1983 [JP] Japan ................. 58-033646

[51] Int. Cl.$^4$ .................. C09K 3/00; C06D 5/10; C11D 7/12
[52] U.S. Cl. ................. 252/350; 252/188.31; 252/157; 252/363.5; 501/84
[58] Field of Search ............ 252/350, 188.31, 157; 501/84

[56] References Cited

U.S. PATENT DOCUMENTS

| | | | |
|---|---|---|---|
| 3,095,312 | 6/1963 | Holmes | 501/84 X |
| 3,141,857 | 7/1964 | Sommer | 501/84 X |
| 3,446,893 | 5/1969 | Hanford | 252/350 X |
| 3,506,756 | 4/1970 | Hoss | 252/350 X |
| 3,518,343 | 6/1970 | Welsh | 252/350 X |
| 3,769,224 | 10/1973 | Inamorato | 252/157 X |
| 3,801,339 | 4/1974 | Ogura | 106/97 |
| 4,075,116 | 2/1978 | Mesaros | 252/186.31 X |
| 4,172,067 | 10/1979 | Benton | 252/350 X |
| 4,180,467 | 12/1979 | Barth | 252/157 X |
| 4,205,994 | 6/1980 | Moyer | 106/118 X |
| 4,252,664 | 2/1981 | Inamorato | 252/350 X |
| 4,272,393 | 6/1981 | Gergely | 252/188.31 X |
| 4,409,030 | 10/1983 | Minegishi | 106/97 |
| 4,460,720 | 7/1984 | Gaidis | 524/158 X |
| 4,502,892 | 3/1985 | Westermann | 252/350 X |

FOREIGN PATENT DOCUMENTS

| | | |
|---|---|---|
| 0017398 | 10/1980 | European Pat. Off. . |
| 0028513 | 5/1981 | European Pat. Off. . |
| 2018891 | 6/1970 | France . |
| 2517988 | 6/1983 | France . |
| 100659 | 8/1923 | Switzerland . |

*Primary Examiner*—John F. Terapane
*Assistant Examiner*—Catherine S. Kilby

[57] ABSTRACT

A demolition agent for brittle materials in the form of a powder mixture comprising 100 parts by weight of quicklime, 0.05 to 5 parts by weight of a carbonate and either or both of 0.01 to 5 parts by weight of a hydroxycarboxylic acid or its salt and 0.1 to 5 parts by weight of a fluidization agent. This demolition agent is used by admixing with water to obtain an aqueous slurry, pouring the slurry into a hole drilled in a brittle material and allowing it to stand to demolish the brittle material by means of expansive pressure from the slurry.

13 Claims, No Drawings

DEMOLITION AGENT FOR BRITTLE MATERIALS

The present invention relates to a demolition agent for brittle materials. More particularly, it relates to a demolition agent for brittle materials in the form of a powder mixture comprising quicklime, carbonate and either or both of hydroxycarboxylic acid or its salt and fluidization agent. This demolition agent is used by admixing with water to obtain an aqueous slurry, pouring the slurry into a hole drilled in a brittle material and allowing it to stand to demolish the brittle material by means of expansive pressure from the slurry. The demolition agent of the present invention can demolish brittle materials such as rocks, concrete, bricks and the like without using explosives.

It has hitherto been proposed various methods for demolishing brittle materials which utilize expansive stress produced from hydration of quicklime. Briefly, in such a method, a hole is drilled in a brittle material and an aqueous slurry containing quicklime is filled into the hole to demolish the brittle material by means of the expansive stress of the slurry. However, in general, the hydration reaction of quicklime itself is very violent and hence, if an aqueous slurry to be used in this method is prepared by simply adding water to quicklime powder and mixing the resulting mixture, a large amount of heat is evolved during mixing. Further, the slurry thus prepared is liable to quickly reduce its fluidity and hence, sometimes it is impossible to maintain the slurry in a fluid state suitable for filling it into a hole. These undesirable phenomena significantly occur in summer when atmospheric temperature rises to a high temperature because the rate of the hydration reaction of quicklime increases at a high temperature. Although these undesirable phenomena can be inhibited to some extent by increasing an amount of water to be added to quicklime, in such a case, the desired demolition effects can not be attained since the expansive pressure from hydration of quicklime becomes low. In addition, since, even after such an aqueous slurry of quicklime has been filled in a hole drilled in a brittle material, hydration of quicklime continues to raise an inner temperature and thereby the reaction is accelerated and finally reaches to the boiling point of the slurry, the use of the aqueous slurry of quicklime itself is sometimes accompanied by dangerous so-called "gun phenomenon" in which the slurry together with water vapor are explosively spouted from the opening of the hole. For these problems, it has been practically impossible to use quicklime itself as a demolition agent for brittle materials.

In order to solve these problems, several proposals have been made. For example, cement is used in combination with quicklime or a special clinker powder having a high content of quicklime component is used in stead of quicklime itself. Some of these proposals have been practically utilized.

However, in these proposals, there are the following problems. That is, although it is strongly required that this kind of demolition agents must be of low cost to be used in place of rather cheap explosives. From this point of view, in case of using a special clinker powder, the powder is expensive and does not meet this requirement. Further, in case of using quicklime in combination with cement, since the component responsible for production of expansive pressure to demolish a brittle material is quicklime which remarkably expands its volume by hydration, whereas cement is mainly responsible for inhibition of "gun phenomenon", to add a considerable amount of the component other than quicklime to a demolition agent is to reduce production of expansive pressure and is undesirable.

Under these circumstances, in order to obtain a demolition agent for brittle materials by using quicklime itself to the utmost, the present inventors have intensively studied. As the results, it has been found that a powder mixture comprising quicklime, a carbonate and either or both of a hydroxycarboxylic acid or its salt and a fluidization agent can serve as a demolition agent for brittle materials which has excellent properties and shows good effects, and inter alia a powder mixture comprising quicklime, a carbonate and a hydroxycarboxylic acid or its salt shows sufficient effects even in summer.

The main object of the present invention is to provide a demolition agent for brittle materials containing quicklime as the main component which is free from the above problems.

This object as well as other objects and advantages of the present invention will become apparent to those skilled in the art from the following description.

According to the present invention, there is provided a demolition agent for brittle materials in the form of a powder mixture comprising quicklime, a carbonate and either or both of a hydroxycarboxylic acid or its salt and a fluidization agent. The powder mixture of the present invention can be prepared, for example, by adding 0.05 to 5 parts by weight of a carbonate and either or both of 0.01 to 5 parts by weight of a hydroxycarboxylic acid or its salt and 0.1 to 5 parts by weight of a fluidization agent to 100 parts by weight of quicklime and pulverizing the resulting mixture.

As to a particle size in pulverizing, in general, when the particle size is small, i.e., when particles are relatively finely pulverized, the hydration reaction of the resulting powder mixture relatively readily proceeds and, when water is added to the powder mixture to prepare an aqueous slurry, a period during which the slurry retains fluidity sufficient for filling it in a hole drilled in a brittle material (hereinafter referred to as fluidity retention time) becomes short. On the other hand, when the particle size is large, i.e., when particles are relatively coarsely pulverized, the hydration reaction of the resulting powder mixture relatively slowly proceeds and the fluidity retention time becomes long. Further, even if the particle size is the same, the fluidity retention time also varies depending upon quality of quicklime to be used and kinds of a hydroxycarboxylic acid or its salt and a fluidization agent to be used. Furthermore, the fluidity retention time also varies depending upon an amount of water to be used in the preparation of an aqueous slurry, water temperature and external atmospheric temperature and the like. Thus, the properties and the capabilities of the powder mixture of the present invention are effected not only by the particle size, but also by other various factors and hence the particle size of the powder mixture of the present invention is not critical. However, for example, such a particle size that about 10 to 60% of all the particles of the powder mixture remain on a 88 $\mu$m screen is generally preferred.

Quicklime to be used in the present invention may be any commercially available massive quicklime or coarsely pulverized quicklime obtained by coarsely pulverizing a commercially available massive quicklime in such a particle size that all particles can pass through, e.g., a 10 mm screen. However, in view of the technical effects of the present invention, it is preferable to use so-called hard calcined quicklime the burning zone temperature of which is 1,200° to 1,400° C. and, most preferably, hard calcined quicklime having the activity of 200 ml or less in terms of 10 minutes value of 100 g method in Japan Lime Association's Reference Test Method is used.

Examples of the carbonate used in the present invention are alkali metal carbonates or bicarbonates such as lithium carbonate or bicarbonate, sodium carbonate or bicarbonate, potassium carbonate or bicarbonate and the like, organic base carbonates or bicarbonates such as triethylamine carbonate or bicarbonate, diethanolamine carbonate or bicarbonate, triethanolamine carbonate or bicarbonate and the like. These carbonates can be used alone or in combination thereof.

Examples of the hydroxycarboxylic acid or its salt used in the present invention are gluconic acid, glucoheptonic acid, arabonic acid, malic acid, citric acid, tartaric acid, mucic acid, saccharic acid, salicylic acid, lactones of hydroxycarboxylic acids which can be converted into the corresponding hydroxycarboxylic acids in the presence of water for example arabono-$\gamma$-lactone, glucono-$\gamma$-lactone, glucono-$\delta$-lactone and the like, and salts thereof. Examples of the salts are their alkali metal salts such as sodium salt, potassium salt and the like, their alkaline earth metal salts such as calcium salt, magnesium salt and the like, their organic base salts such as ammonium salt, trimethylamine salt, triethylamine salt, diethanolamine salt, triethanolamine salt and the like. These hydroxycarboxylic acids or salts thereof can be used alone or in combination thereof.

Examples of the fluidization agent to be used in the present invention are naphthalenesulfonic acid-formalin condensation products, melamine sulfonic acid-formalin condensation products, lignin sulfonic acid, their alkali metal salts such as sodium salt, potassium salt and the like, their alkaline earth metal salts such as calcium salt, magnesium salt and the like, their organic base salts such as ammonium salt, trimethylamine salt, triethylamine salt, diethanolamine salt, triethanolamine salt and the like. These fluidization agents can be used alone or in combination thereof.

Each amount of the carbonate, the hydroxy-carboxylic acid or its salt or the fluidization agent to be added to the demolition agent of the present invention varies depending upon such factors as a temperature at which the demolition agent is used, properties and a particle size of quicklime to be used, a total amount of the components other than quicklime, a mixing ratio of the components and the like. However, in general, it is preferable to use the components other than quicklime in total in an amount of 0.1 to 3 parts by weight, when the resulting demolition agent is used at a temperature of about −5° to 10° C.; 0.3 to 5 parts by weight, when the temperature is about 10° to 25° C.; or 1 to 10 parts by weight, when the temperature is about 25° to 40 ° C.

In one aspect of the present invention, the demolition agent comprises quicklime, the carbonate and the hydroxycarboxylic acid or its salt. In this aspect, the ratio of the hydroxycarboxylic acid or its salt to the carbonate is within the range of the hydroxycarboxylic acid or its salt/the carbonate being 5/95 to 95/5, preferably, 30/70 to 90/10, more preferably, 50/50 to 75/25.

As mentioned hereinafter, the demolition agent of the present invention is used in the form of an aqueous slurry prepared by adding 20 to 50 parts by weight of water to 100 parts by weight of the demolition agent and the fluidity retention time of the aqueous slurry greatly effects on workability.

In this regard, the demolition agent of the above aspect of the present invention shows excellent capabilities. However, when it is required to further increase fluidity of the demolition agent in view of working sites, atmospheric temperature and other factors, in most cases, good results can be attained by adding, in addition to the carbonate and the hydroxycarboxylic acid or its salt, the above fluidization agent in an amount of 0.1 to 5 parts by weight per 100 parts by weight of quicklime to the demolition agent.

Further, the demolition agent having more preferable properties can be obtained by using partially slaked quicklime prepared by adding 0.1 to 5 parts by weight of water to 100 parts by weight of massive quicklime or coarsely pulverized quicklime during pulverization thereof. This water to slake quicklime may be used alone or together with the above hydroxycarboxylic acid or its salt, the carbonate or the fluidization agent in the form of an aqueous solution or suspension.

The demolition agent for brittle materials of this aspect can be prepared, for example, by the following processes:

(1) Massive quicklime or coarsely pulverized quicklime which is prepared by pulverizing massive quicklime in such a particle size that all the particles can pass through a 10 mm screen is pulverized to obtain quicklime powder; and 0.01 to 5 parts by weight of the hydroxy-carboxylic acid or its salt and 0.05 to 5 parts by weight of the carbonate are admixed with the 100 parts by weight of the quicklime powder to obtain the desired demolition agent powder mixture.

In this case, it is preferable that the quicklime powder used has such a particle size that 10 to 60% of all the particles remain on a 88 μm screen.

(2) 0.01 To 5 parts by weight of the hydroxy-carboxylic acid or its salt and 0.05 to 5 parts by weight of the carbonate are added to 100 parts by weight of massive quicklime or coarsely pulverized quicklime which is prepared by pulverizing massive quicklime in such a particle size that all the particles can pass through a 10 mm screen to obtain a mixture; and the mixture is pulverized to obtain the desired demolition agent powder mixture.

In this case, it is preferable that the powder mixture has such a particle size that 10 to 60% of all the particles remain on a 88 μm screen.

(3) Massive quicklime is pulverized, for example, in such a particle size that all the particles can pass through a 10 mm screen to obtain coarsely pulverized quicklime; an aqueous solution or suspension consisting of 0.1 to 5 parts by weight of the fluidization agent and 0.1 to 5 parts by weight of water is added to 100 parts by weight of the coarsely pulverized quicklime followed by addition of 0.01 to 5 parts by weight of the hydroxycarboxylic acid or its salt and 0.05 to 5 parts by weight of the carbonate; and then the resulting mixture is pulverized to obtain the desired demolition agent powder mixture.

In this case, it is preferable that the mixture has such a particle size that 10 to 60% of all the particles remain on a 88 μm screen.

(4) Massive quicklime is pulverized, for example, in such a particle size that all the particles can pass through a 10 mm screen to obtain coarsely pulverized quicklime; an aqueous solution or suspension prepared by adding 0.1 to 5 parts by weight of the fluidization agent to 0.1 to 5 parts by weight of water is added to 100 parts by weight of the coarsely pulverized quicklime and the resulting mixture is pulverized to obtain a powder mixture, as the first step; and then, as the second step, 0.01 to 5 parts by weight of the hydroxycarboxylic acid or its salt and 0.05 to 5 parts by weight of the carbonate are homogeneously admixed with the powder mixture to obtain the desired demolition agent.

In this case, it is preferable that the powder mixture has such a particle size that 10 to 60% of all the particles remain on a 88 μm screen.

In another aspect of the present invention, the demolition agent comprises quicklime, the carbonate and the fluidization agent. In most cases, good results can be attained by using the demolition agent of this aspect at a relatively low temperature. When the demolition agent of this aspect is used at about −5° to 15° C., the total amount of the components other than quicklime is 0.1 to 3 parts by weight per 100 parts by weight of quicklime is more preferable.

Again, the demolition agent having more preferable properties can be also obtained by using partially slaked quicklime which is prepared by adding 0.1 to 5 parts by weight of water to 100 parts by weight of massive quicklime or coarsely pulverized quicklime during pulverization thereof. This water to slake quicklime can be used alone or together with the above fluidization agent or carbonate in the form of an aqueous solution or suspension.

The demolition agent for brittle materials of this aspect can be prepared, for example, by the following processes:

(1) Massive quicklime or coarsely pulverized quicklime which is prepared by pulverizing massive quicklime in such a particle size that all the particles can pass through a 10 mm screen is pulverized to obtain quicklime powder; and 0.1 to 5 parts by weight of the fluidization agent and 0.05 to 5 parts by weight of the carbonate are admixed with 100 parts by weight of quicklime powder to obtain the desired demolition agent powder mixture.

In this case, it is preferable that quicklime powder has such a particle size that 10 to 60% of all the particles remain on a 88 μm screen.

(2) 0.1 to 5 Parts by weight of the fluidization agent and 0.05 to 5 parts by weight of the carbonate are admixed with 100 parts by weight of massive quicklime or coarsely pulverized quicklime which is prepared by pulverizing massive quicklime in such a particle size that all particles can pass through a 10 mm screen to obtain a mixture; and the resulting mixture is pulverized to obtain the desired demolition agent powder mixture.

In this case, it is preferable that the powder mixture has such a particle size that 10 to 60% of all the particles remain on a 88 μm screen.

(3) Massive quicklime is pulverized, for example, in such a particle size that all the particles can pass through a 10 mm screen to obtian coarsely pulverized quicklime; an aqueous solution or suspension consisting of 0.1 to 5 parts by weight of the fluidization agent and 0.1 to 5 parts by weight of water is added to 100 parts by weight of the coarsely pulverized quicklime followed by addition of 0.05 to 5 parts by weight of the carbonate; and the resulting mixture is pulverized to obtain the desired demolition agent powder mixture.

In this case, it is preferable that the mixture has such a particle size that 10 to 60% of all the particles remain on a 88 μm screen.

(4) Massive quicklime is pulverized, for example, in such a particle size that all the particles can pass through a 10 mm screen to obtain coarsely pulverized quicklime; an aqueous solution or suspension prepared by adding 0.1 to 5 parts by weight of the fluidization agent to 0.1 to 5 parts by weight of water is added to 100 parts by weight of the coarsely pulverized quicklime and the resulting mixture is pulverized to obtain a powder mixture, as the first step; and then, as the second step, 0.05 to 5 parts by weight of the carbonate is homogeneously admixed with the powder mixture to obtain the desired demolition agent powder mixture.

In this case, it is preferable that the powder mixture has such a particle size that 10 to 60% of all the particles remain on a 88 μm screen.

According to the present invention, a brittle material can be demolished by admixing 20 to 50 parts by weight of water with 100 parts by weight of the demolition agent prepared by one of the above processes to obtain an aqueous slurry of the demolition agent, pouring the slurry into a hole drilled in the brittle material and allowing it to stand to produce expansive stress. Usually, it is sufficient to allow the slurry to stand for about 10 to 24 hours after it has been poured into a hole, but this time varies depending upon strength of materials to be demolished and the like.

Examples of brittle materials to be demolished are rocks, concrete, bricks and the like.

Alternatively, the same results can be also attained by previously dissolving or dispersing the carbonate, either or both of the hydroxycarboxylic acid or its salt and the fluidization agent in water and adding quicklime powder to the resulting solution or dispersion to obtain an aqueous slurry. That is, for example, 0.05 to 5 parts by weight of the carbonate, either or both of 0.01 to 5 parts by weight of the hydroxycarboxylic acid or its salt and 0.1 to 5 parts by weight of the fluidization agent are dissolved in 20 to 50 parts by weight of water and then 100 parts by weight of quicklime powder is added to the resulting solution to obtain an aqueous slurry. According to this method, it is possible to maintain sufficient fluidity as well as to prevent heat evolution during admixing and a brittle material can be demolished by pouring the resulting slurry into a hole drilled in the material and allowing it to stand.

The following examples further illustrate the present invention in detail but are not to be construed to limit the scope thereof. In the following examples, all the "parts" are by weight unless otherwise stated. In the examples, tests for confirming capabilities of the demolition agent were carried out as follows:

(a) Measurement of expansive pressure

A steel pipe 25(A) of carbon steel for pressure piping of JIS G3454 was cut in the length of 40 cm and one end of the pipe was welded to a steel plate so that the pipe vertically stood on the plate with the top open end. The pipe was fitted with paper strain gauges at 2 outer periphery parts thereof. An aqueous slurry prepared by mixing the demolition agent to be tested with a predetermined amount of water was filled in the pipe through its top open end. The expansive static strain of the pipe was measured, while the pipe was externally cooled and the expansive pressure (kgf/cm$^2$) was calculated.

Although the expansive pressure necessary for using as the demolition agent according to the present invention varies depending upon kinds of brittle materials to be demolished, in general, the expansive pressure of 200 kgf/cm² or more is preferred.

(b) Measurement of fluidity retention time

The J funnel for measuring PC grout applied by Japan Civil Engineering Association was used. An aqueous slurry was prepared by admixing the demolition agent to be tested with a predetermined amount of water and the time-course of the time (sec.) required for flow down of 640 ml of the slurry through the J funnel was observed. The period during which the time required for flow down of 640 ml of the slurry through the J funnel was maintained within 30 seconds or less was deemed to be the fluidity retention time.

EXAMPLE 1

Coarsely pulverized quicklime (50 kg) having such a particle size that all the particles passed through a 10 mm screen which was prepared from hard calcined massive quicklime the burning zone temperature of which was 1,200° to 1,400° C. was pulverized with a ball mill to obtain quicklime powder having such a particle size that 37% of all the particles remain on a 88 μm screen.

To the resulting quicklime powder (100 parts) were added the hydroxycarboxylic acid or its salt and the carbonate in the amounts as shown in the following Table 1 and homogeneously mixed to obtain each demolition agent for brittle materials. Each demolition agent (100 parts) was admixed with water (30 parts) to obtain an aqueous slurry and the fluidity retention time and the expansive pressure of the aqueous slurry were measured in a room at 30° C.

The results are shown in Table 1.

TABLE 1

| No. | Hydroxycarboxylic acid or its salt | | Carbonate | | Fluidity retention time (min.) | Expansive pressure after 12 hours (kgf/cm²) |
|---|---|---|---|---|---|---|
| | Compounds | Amount (parts) | Compounds | Amount (parts) | | |
| 1 | Sodium citrate | 1.33 | Potassium carbonate | 2.67 | 40 | 270 |
| 2 | Sodium gluconate + Malic acid | 0.95 + 0.05 | Sodium carbonate | 1.5 | 30 | 333 |
| 3 | Glucono-δ-lactone | 1.33 | Sodium carbonate | 2.67 | 40 | 314 |

EXAMPLE 2

Coarsely pulverized quicklime (50 kg) having such a particle size that all the particles passed through a 10 mm screen which prepared from hard calcined massive quicklime the burning zone temperature of which was 1,200° to 1,400° C. was pulverized by a ball mill, while scattering a solution prepared by mixing sodium salt of naphthalenesulfonic acid-formalin condensation product (0.67 part per 100 parts of quicklime) and water (1.0 part per 100 parts of quicklime) to obtain a powder mixture having such a particle size that 40% of all the particles remain on a 88 μm screen. To the powder mixture were added the hydroxy-carboxylic acid or its salt and the carbonate in the amounts as shown in the following Table 2 (the amounts in Table 2 were based on 100 parts by weight of coarsely pulverized quickline in the powder used) and the resulting mixture was homogeneously mixed to obtain each demolition agent for brittle materials. Each demolition agent (100 parts) was admixed with water (30 parts) to obtain an aqueous slurry and the fluidity retention time and the expansive pressure of the resulting slurry were measured in a room at 35? C.

The results are shown in table 2.

TABLE 2

| No. | Hydroxycarboxylic acid or its salt | | Carbonate | | Fluidity retention time (min.) | Expansive pressure after 12 hours (kgf/cm²) |
|---|---|---|---|---|---|---|
| | Compounds | Amount (parts) | Compounds | Amount (parts) | | |
| 1 | Sodium gluconate | 1.0 | Sodium carbonate | 1.5 | 35 | 310 |
| 2 | Sodium gluconate + Malic acid | 0.95 + 0.05 | Sodium carbonate | 0.5 | 28 | 366 |
| 3 | Sodium gluconate + Malic acid | 0.95 + 0.05 | Sodium carbonate | 1.0 | 38 | 356 |
| 4 | Sodium gluconate + Malic acid | 0.95 + 0.05 | Sodium carbonate | 1.5 | 45 | 340 |
| 5 | Sodium gluconate + Malic acid | 0.95 + 0.05 | Sodium carbonate | 2.0 | 47 | 310 |
| 6 | Sodium gluconate + Malic acid | 0.95 + 0.05 | Sodium carbonate | 3.0 | 24 | 295 |
| 7 | Sodium gluconate + Malic acid | 1.425 + 0.075 | Sodium carbonate | 1.0 | 40 | 363 |
| 8 | Sodium gluconate + | 1.425 + 0.075 | Sodium carbonate | 2.0 | 40 | 317 |

TABLE 2-continued

| | Hydroxycarboxylic acid or its salt | | Carbonate | | Fluidity retention | Expansive pressure after |
|---|---|---|---|---|---|---|
| No. | Compounds | Amount (parts) | Compounds | Amount (parts) | time (min.) | 12 hours (kgf/cm²) |
| | Malic acid | | | | | |

EXAMPLE 3

Coarsley pulverized quicklime (50 kg) having such a particle size that all the particles passed through a 10 mm screen which prepared from hard calcined massive quicklime the burning zone temperature of which was 1,200° to 1,400° C. was pulverized by a ball mill, while scattering a solution prepared by mixing sodium salt of naphthalenesulfonic acid-formalin condensation product (0.67 part per 100 parts of quicklime) and water (1.0 part peer 100 parts of quicklime) to obtain a powder mixture having such a particle size that 40% of all the particles remain on a 88 mm screen. To the powder mixture were added the hydroxycarboxylic acid or its salt and the carbonate in the amounts as shown in the following Table 3 (the amounts in Table 3 were based on 100 parts of coarsely pulverized quicklime in the powder used) and homogeneously mixed to obtain the demolition agent for brittle materials. The resulting demolition agent (100 parts) was admixed with water (30 parts) to obtain an aqueous slurry and the fluidity retention time and the expansive pressure of the slurry was measured in a room at 30° C.

The results are shown in Table 3.

EXAMPLE 4

Coarsley pulverized quicklime (50 kg) having such a particle size that all the particles passed through a 10 mm screen which prepared from hard calcined massive quicklime the burning zone temperature of which was 1,200° to 1,400° C. was pulverized by a ball mill, while scattering a solution prepared by mixing sodium salt of naphthalenesulfonic acid-formalin condensation product (0.67 part per 100 parts of quicklime) and water (1.0 part peer 100 parts of quicklime) to obtain a powder mixture having such a particle size that 40% of all the particles remain on a 88 mm screen. To the powder mixture were added the hydroxycarboxylic acid or its salt and the carbonate in the amounts shown in Table 4 (the amounts in Table 4 were based on 100 parts of coarsely pulverized quicklime in the powder used) and homogeneously mixed to obtain the demolition agent for brittle materials. The resulting demolition agent (100 parts) was admixed with water (30 parts) to obtain an aqueous slurry and the fluidity retention time and the expansive pressure of the aqueous slurry were measured in a room at 20° C.

The results are shown in Table 4.

TABLE 3

| | Hydroxycarboxylic acid or its salt | | Carbonate | | Fluidity retention | Expansive pressure after |
|---|---|---|---|---|---|---|
| No. | Compounds | Amount (parts) | Compounds | Amount (parts) | time (min.) | 12 hours (kgf/cm²) |
| 1 | Sodium gluconate | 1.0 | Sodium carbonate | 1.5 | 40 | 363 |
| 2 | Sodium gluconate | 1.33 | Sodium carbonate | 2.67 | 40 | 224 |
| 3 | Sodium glucoheptonic acid | 0.67 | Sodium carbonate | 1.3 | 40 | 268 |
| 4 | Sodium glucoheptonic acid | 1.33 | Sodium carbonate | 2.67 | 30 | 232 |
| 5 | Sodium gluconate + Malic acid | 0.95 + 0.05 | Sodium carbonate | 1.5 | 40 | 265 |
| 6 | Sodium citrate | 1.33 | Potassium carbonate | 2.67 | 40 | 294 |
| 7 | Potassium tartarate | 2.0 | Potassium carbonate | 4.0 | 20 | 213 |

TABLE 4

| | Hydroxycarboxylic acid or its salt | | Carbonate | | Fluidity retention | Expansive pressure after |
|---|---|---|---|---|---|---|
| No. | Compounds | Amount (parts) | Compounds | Amount (parts) | time (min.) | 24 hours (kgf/cm²) |
| 1 | Sodium gluconate + Malic acid | 0.475 + 0.025 | Potassium carbonate | 0.1 | 50 | 360 |
| 2 | Sodium gluconate + Malic acid | 0.475 + 0.025 | Potassium carbonate | 0.3 | 120 | 230 |
| 3 | Sodium gluconate + Malic acid | 0.475 + 0.025 | Potassium carbonate | 0.5 | 180 | 220 |

TABLE 4-continued

| No. | Hydroxycarboxylic acid or its salt Compounds | Amount (parts) | Carbonate Compounds | Amount (parts) | Fluidity retention time (min.) | Expansive pressure after 24 hours (kgf/cm²) |
| --- | --- | --- | --- | --- | --- | --- |
| 4 | Sodium gluconate + Malic acid | 0.475 + 0.025 | Sodium bicarbonate | 0.1 | 60 | 305 |
| 5 | Sodium gluconate + Malic acid | 0.475 + 0.025 | Sodium bicarbonate | 0.3 | 120 | 240 |
| 6 | Sodium gluconate + Malic acid | 0.475 + 0.025 | Sodium bicarbonate | 0.5 | 170 | 225 |
| 7 | Sodium gluconate + Malic acid | 0.475 + 0.025 | Sodium carbonate | 0.1 | 60 | 242 |
| 8 | Sodium gluconate | 0.5 | Sodium carbonate | 0.1 | 50 | 360 |

EXAMPLE 5

Coarsely pulverized quicklime (50 kg) having such a particle size that all the particles passed through a 10 mm screen which prepared from hard calcined massive quicklime the burning zone temperature of which was 1,200° to 1,400° C. was pulverized by a ball mill, while scattering a solution prepared by mixing sodium salt of naphthalenesulfonic acid-formalin condensation product (0.67 part per 100 parts of quicklime) and water (1.0 part peer 100 parts of quicklime) to obtain a powder mixture having such a particle size that 40% of all the particles remain on a 88 mm screen. To the powder mixture were added the hydroxycarboxylic acid or its salt and the carbonate in the amounts as shown in the following Table 5 (the amounts in Table 5 are based on 100 parts of coarsely pulverized quicklime in the powder used). To the resulting mixture was added sodium salt of naphthalenesulfonic acid-formalin condensation product (0.45 parts) and homogeneously mixed to obtain the demolition agent for brittle materials. The resulting demolition agent (100 parts) was admixed with water (30 parts) to obtain an aqueous slurry and the fluidity retention time and the expansive pressure of the slurry were measured in a room at 5° C.

The results are shown in Table 5.

TABLE 5

| No. | Hydroxycarboxylic acid or its salt Compounds | Amount (parts) | Carbonate Compounds | Amount (parts) | Fluidity retention time (min.) | Expansive pressure after 24 hours (kgf/cm²) |
| --- | --- | --- | --- | --- | --- | --- |
| 1 | Sodium gluconate | 0.05 | Sodium carbonate | 0.1 | 26 | 250 |
| 2 | Sodium gluconate | 0.05 | Sodium carbonate | 0.3 | 50 | 238 |
| 3 | Sodium gluconate | 0.05 | Sodium carbonate | 0.4 | 42 | 208 |

EXAMPLE 6

Sodium gluconate (1 part) and sodium carbonate (1.5 parts) were dissolved in water (30 parts). To this solution was added a powder mixture (100 parts) to obtain an aqueous slurry. The powder mixture was prepared as follows. Coarsely pulverized quicklime (50 kg) having such a particle size that all the particles passed through a 10 mm screen which prepared from hard calcined massive quicklime the burning zone temperature of which was 1,200° to 1,400° C. was pulverized by a ball mill, while scattering a solution prepared by mixing sodium salt of naphthalenesulfonic acid-formalin condensation product (0.67 part per 100 parts of quicklime) and water (1.0 part peer 100 parts of quicklime) to obtain a powder mixture having such a particle size that 40% of all the particles remain on a 88 mm screen. To the powder mixture The fluidity retention time and the expansive pressure of the slurry were measured in a room at 30° c.

As the results, the fluidity retention time was 50 minutes and the expansive pressure was 300 kgf/cm² (12 hours after pouring).

EXAMPLE 7

Nine holes (each diameter: 40 mm, depth: 1,300 mm) were drilled on the surface of a sample of non-reinforced concrete (1.5×1.5×1.5 m, age: 30 days, compressive strength: 295 kgf/cm², tensile strength: 21 kgf/cm²) at equal intervals.

A demolishing test was carried out by pouring an aqueous slurry prepared by admixing the demolition agent in Table 4, No. 7 of Example 4 (100 parts) with water (30 parts) into the holes and allowing it to stand at atmospheric temperature varying from 8° to 18° C.

Crack initiation was observed at the edges of the upper surface and periphery of the sample about 24 to 25 hours after pouring the slurry into the holes and at the center part of the upper surface of the sample after about 30 hours. The widths of cracks were increased with the lapse of time and, after 40 hours, the widths were 40 to 50 mm at the periphery and 20 mm at the center part.

EXAMPLE 8

Coarsely pulverized quicklime (50 kg) having such a particle size that all the particles passed through a 10 mm screen which prepared from hard calcined massive quicklime the burning zone temperature of which was 1,200° to 1,400° C. was pulverized by a ball mill in such a particle size that 37% of all the particles remain on a 88 μm screen to obtain a quicklime powder. To the resulting powder (100 parts) were added sodium salt of naphthalenesulfonic acid-formalin condensation product and sodium carbonate in the amounts shown in the following Table 6 and homogeneously mixed to obtain the demolition agent for brittle materials. The demolition agent (100 parts) was admixed with water (30 parts) to obtain an aqueous slurry and the fluidity retention time and the expansive pressure of the aqueous slurry were measured in a room at 5° C.

The results are shown in Table 6.

TABLE 6

| No. | NSA* (parts) | Sodium carbonate (parts) | Fluidity retention time (min.) | Expansive pressure (kgf/cm²) | |
|---|---|---|---|---|---|
| | | | | After 12 hours | After 24 hours |
| 1 | 0.5 | 0.3 | 10 | 205 | 285 |
| 2 | 1.2 | 0.3 | 20 | 184 | 270 |

*naphthalenesulfonic acid-formalin condensation product

EXAMPLE 9

To coarsely pulverized quicklime (50 kg) obtained by the same manner as in Example 8 were added naphthalenesulfonic acid-formalin condensation product (1.14 parts per 100 parts of quicklime), sodium carbonote (0.3 part per 100 parts of quicklime) and water (1 part per 100 parts of quicklime) and the mixture was pulverized in such a particle size that 40% of all the particles remain on a 88 μm screen to obtain a demolition agent. The demolition agent (100 parts) was admixed with water (30 parts) at 5° C. and the fluidity retention time and the expansive pressure were measured in a room at 5° C. The fluidity retention time was 75 minutes and the expansive pressure after 24 hours was 230 kgf/cm².

EXAMPLE 10

To coarsely pulverized quicklime (50 kg) obtained by the same manner as in Example 8 were added naphthalenesulfonic acid-formalin condensation product (0.67 part per 100 parts of quicklime) and water (1 part per 100 parts of quicklime) and the resulting mixture was pulverized in such an particle size that 40% of all the particles remain on a 88 μm screen to obtain quicklime powder. The resulting quicklime powder (100 parts) was admixed with a solution (5° C.) prepared by dissolving the materials shown in the following Table 7 in water (30 parts) to obtain an aqueous slurry. The fluidity retention time and the expansive pressure of the slurry were measured in a room at 5° C.

The results are shown in table 7.

TABLE 7

| No. | NSA* (parts) | Sodium carbonate (parts) | Fluidity retention time (min.) | Expansive pressure (kgf/cm²) | |
|---|---|---|---|---|---|
| | | | | After 12 hours | After 24 hours |
| 1 | 0.5 | 0.3 | 27 | 170 | 235 |
| 2 | 0.5 | 0.4 | 35 | 140 | 210 |
| 3 | 0.5 | 0.5 | 45 | 180 | 220 |

*naphthalenesulfonic acid-formalin condensation product

What is claimed is:

1. A demolition agent for brittle materials in the form of a powder mixture which comprises:
   (a) 100 parts by weight of quicklime,
   (b) 0.05 to 5 parts by weight of an alkali metal carbonate or bicarbonate, and
   (c) 0.1 to 5 parts by weight of a fluidization agent.

2. A demolition agent according to claim 1 wherein the agent further contains 0.1 to 5 parts by weight of water.

3. A demolition agent according to claim 1 wherein the carbonate is a member selected from the group consisting of sodium carbonate, potassium carbonate, sodium bicarbonate and a mixture thereof.

4. A demolition agent according to claim 1 wherein the hydroxycarboxylic acid or its salt is a member selected from the group consisting of gluconic acid, glucoheptonic acid, malic acid, citric acid, tartaric acid, a salt thereof and a mixture thereof.

5. A demolition agent according to claim 1 wherein the fluidization agent is a naphthalenesulfonic acid-formalin condensation product.

6. A demolition agent according to claim 1 wherein the agent comprises 100 parts by weight of quicklime, 0.05 to 5 parts by weight of sodium carbonate, 0.01 to 5 parts by weight of sodium gluconate and 0.1 to 5 parts by weight of a naphthalenesulfonic acid-formalin condensation product.

7. A demolition agent according to claim 1 wherein the agent comprises 100 parts by weight of quicklime, 0.05 to 5 parts by weight of sodium carbonate and 0.1 to 5 parts by weight of a naphthalenesulfonic acid-formalin condensation product.

8. A demolition agent according to claim 2 wherein the carbonate is a member selected from the group consisting of sodium carbonate, potassium carbonate, sodium bicarbonate and a mixture thereof.

9. A demolition agent according to claim 2 wherein the hydroxycarboxylic acid or its salt is a member selected from the group consisting of gluconic acid, glucoheptonic acid, malic acid, citric acid, tartaric acid, a salt thereof and a mixture thereof.

10. A demolition agent according to claim 2 wherein the fluidization agent is a naphthalenesulfonic acid-formalin condensation product.

11. A demolition agent according to claim 2 wherein the agent comprises 100 parts by weight of quicklime, 0.05 to 5 parts by weight of sodium carbonate, 0.01 to 5 parts by weight of sodium gluconate and 0.1 to 5 parts by weight of a naphthalenesulfonic acid-formalin condensation product.

12. A demolition agent according to claim 2 wherein the agent comprises 100 parts by weight of quicklime, 0.05 to 5 parts by weight of sodium carbonate and 0.1 to 5 parts by weight of a naphthalenesulfonic acid-formalin condensation product.

13. A demolition agent according to claim 1 wherein the agent further comprises 0.01 to 5 parts by weight of a hydroxycarboxylic acid, its salt, or a mixture thereof.

* * * * *